(12) United States Patent
Lin et al.

(10) Patent No.: US 6,181,748 B1
(45) Date of Patent: Jan. 30, 2001

(54) PULSE SHAPER APPARATUS AND METHOD FOR ISDN U-INTERFACE

(75) Inventors: Hsan-Fong Lin; Wen-Fu Yang; Jhy-Rong Chen, all of Hsinchu (TW)

(73) Assignee: Macronix International Co., Hsinchu (TW)

( * ) Notice: Under 35 U.S.C. 154(b), the term of this patent shall be extended for 0 days.

(21) Appl. No.: 09/112,064

(22) Filed: Jul. 7, 1998

(51) Int. Cl.[7] .................................................. H04L 25/00
(52) U.S. Cl. ........................ 375/257; 375/286; 327/126
(58) Field of Search ............................... 375/257, 285, 375/286, 295, 296; 327/22, 50, 94, 126, 127, 178, 291, 128

(56) References Cited

U.S. PATENT DOCUMENTS

| | | | |
|---|---|---|---|
| 4,754,386 | * 6/1988 | Weerd | 363/21 |
| 4,814,637 | 3/1989 | Roessler et al. | 307/268 |
| 5,200,751 | * 4/1993 | Smith | 341/147 |
| 5,598,438 | * 1/1997 | Lepping | 375/317 |

OTHER PUBLICATIONS

Herbert B. Voelcker. "Generation of Digital Signaling Waveforms." IEEE Transactions on Communication Technology, vol. Com–16, No. 1, Feb. 1968. pp. 81–93.

* cited by examiner

Primary Examiner—Don N. Vo
(74) Attorney, Agent, or Firm—Lariviere, Grubman & Payne, LLP (57) ABSTRACT

A pulse shaper for integrated service digital network (ISDN) U-interface. The pulse shaper of the present invention includes a couple of control clock generators, a clock-controlled fully differential switched-capacitor integrator, a fully differential sample and hold circuit, and a fully differential line driver/Rauch lowpass filter. The pulse shaper converts four-level 2B1Q digital input code (D0 and D1) to five staircase-type analog waveform by using fully differential switched-capacitor integrator. The sample and hold circuit then eliminates the spikes in the five-stair waveform and improve the signal linearity. The lowpass filter and telephone line driver is utilized to perform the output signal to comply with the waveform specification of ANSI T1 5.3.2.1 and 5.3.2.2.

20 Claims, 12 Drawing Sheets

PULSE SHAPER APPARATUS AND METHOD FOR ISDN U-INTERFACE

TECHNICAL FIELD

The present invention relates to tele-communication interface circuit apparatus and methods. More particularly, the present invention relates to tele-communication interface circuit apparatus and methods for shaping pulse signals. Even more particularly, the present invention relates to tele-communication interface circuit apparatus and methods for shaping pulse signals for use in ISDN U-interface (integrated service digital network user interface) applications.

BACKGROUND OF THE INVENTION

Conventional pulse shaper presented in 'IEEE Transactions on Communication Technology', Vol. COM-16, No. 1, February, 1968, pp 81–93, is comprised of a resistor arrangement, digital input controlled shift register, and a summing node. The disadvantages of such pulse shaper are that only one polarity output signal can be generated and requires too many resistors.

The pulse shaper presented in U.S. Pat. No. 4,814,637, named 'pulse shaper,' is a well known pulse shaper for ISDN U-interface. The pulse shaper disclosed in U.S. Pat. No. 4,814,637 includes a control signal generator, a summing network including a number of charging capacitors, a controllable switch arrangement, a plurality of logic circuits coupled between the control signal generator and respective ones of the controllable switch arrangement. The respective charging capacitor associated with a respective switch exchanges a component charge with the summing capacitor that corresponds to the step to be formed on the occurance of the particular control signal. The main disadvantage of such pulse shaper is that it requires a series of complex switch topology and as many number of charging capacitor as the steps of the one output staircase-type slope.

BRIEF SUMMARY OF THE INVENTION

The pulse shaper of the present invention includes a couple of control clock generators, a clock-controlled fully differential switched-capacitor integrator, a fully differential sample and hold circuit, and a fully differential line driver/Rauch lowpass filter. The control clock generator generates a specific number of pulses which are responsive to four-level digital 2B1Q coded signals (quarternary signals), to control the switched-capacitor integrator and a cyclic clock to control the sample and hold circuit. The final Rauch lowpass filter is utilized to attenuate, the out-of-band signal power (above 500 kHz) to fit the ANSI specifications.

The main advantage of the present invention is that it requires only a couple of charging capacitors in fully differential structure to perform the identical leading and trailing slopes staircase-type analog waveform. Thus, the total circuit complexity and solid-state area can be greatly reduced. Further, in cooperation with the sample and hold circuit, the spikes generated during the switch's on/off transitions can be easily eliminated such that the formed output signal's linearity will be improved.

BRIEF DESCRIPTION OF DRAWINGS

The features, characteristics, advantages, and the invention in general, will be better understood from the following detailed description of an illustrative embodiment when taken in conjunction with the accompanying drawings in which:

FIG. 4($a$) shows a schematic diagram of the clock-controlled, fully differential switched-capacitor integrator in accordance with the present invention.

FIG. 4($b$) shows the non-overlapping control clock signals in accordance with the present invention for controlling the fully differential switched-capacitor integrator shown in FIG. 4($a$).

FIG. 4($c$) shows the non-overlapping control clock signals in a different phase than FIG. 4($b$), in accordance with the present invention for controlling the fully differential switched-capacitor integrator shown in FIG. 4($a$).

FIG. 5($a$) illustrates a schematic diagram of the sample and hold circuit in accordance with the present invention.

FIG. 5($b$) shows the non-overlapping control clock signals for the controlling the sample and hold circuit shown in FIG. 5($a$).

FIG. 6($a$) illustrates the control clocks and corresponding shaped leading edge output waveforms of the fully differential switched-capacitor integrator and the sample and hold circuit for a ±1 2B1Q signal, in accordance with the present invention.

FIG. 6($b$) illustrates the control clocks and corresponding shaped leading edge output waveforms of the fully differential switched-capacitor integrator and the sample and hold circuit for a ±3 2B1Q signal, in accordance with the present invention.

FIG. 7($a$) illustrates the control clocks and corresponding shaped trailing edge output waveforms of the fully differential switched-capacitor integrator and the sample and hold circuit for a ±1 2B1Q signal, in accordance with the present invention.

FIG. 7($b$) illustrates the control clocks and corresponding shaped trailing edge output waveforms of the fully differential switched-capacitor integrator and the sample and hold circuit for a ±3 2B1Q signal, in accordance with the present invention.

FIG. 8($a$) illustrates a shaped output signal at the sample and hold circuit during a transition period of a +1, +1 2B1Q code input pulse sequence, in accordance with the present invention.

FIG. 8($b$) illustrates the relative control clock signals utilized for the shaped output signal shown in FIG. 8($a$).

FIG. 9($a$) illustrates a shaped output signal at the sample and hold circuit during a transition period of a +1, +3 2B1Q code input pulse sequence, in accordance with the present invention.

FIG. 9($b$) illustrates the relative control clock signals utilized for the shaped output signal shown in FIG. 9($a$).

FIG. 10($a$) illustrates a shaped output signal at the sample and hold circuit during a transition period of a +1, −3 2B1Q code input pulse sequence, in accordance with the present invention.

FIG. 10($b$) illustrates the relative control clock signals utilized for the shaped output signal shown in FIG. 10($a$).

DETAILED DESCRIPTION OF THE INVENTION

Figure 1:
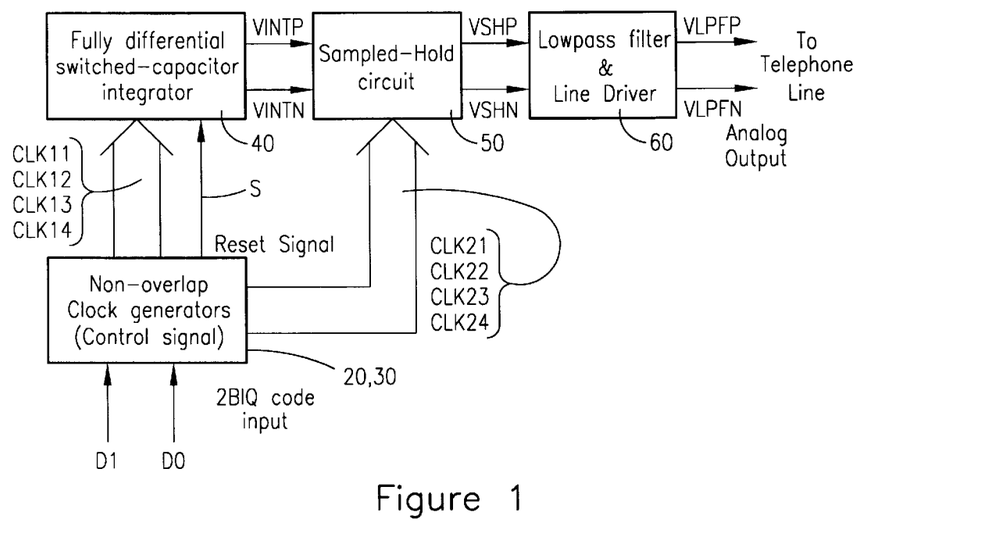
FIG. 1 illustrates the present invention in block diagram form.

FIG. 1 shows a pulse shaper 10 for transmitting from 2B1Q digital signals D1, D0 to specific analog signals VLPFP, VLPFN which fit the specifications of an ISDN U-interface. The pulse shaper 10 is comprised of a couple of non-overlap clock generators 20, 30, a fully differential switched-capacitor integrator 40, a sample and hold circuit 50, and a line driver 60, which is combined with a lowpass filter function. The clock signals CLK11, CLK12, CLK13, and CLK14 are generated with respect to digital input signal, 2B1Q code: D0 and D1, to control the fully differential switched-capacitor integrator 40. The CLK12 signal is the inverse phase non-overlap clock of the CLK11 signal, and the CLK14 signal is also the inverse phase non-overlap clock of CLK13, respectively. The CLK21, CLK22, CLK23, and CLK24 signals are the non-overlap control clocks of the sample and hold circuit 50. The clock pair signals CLK21 and CLK22 and clock pair signals CLK23 and CLK24 are in inverse phase with each other respectively. The VINTP and VINTN signals are the differential output signal of the fully differential switched-capacitor integrator 40. These output signals are inputted to and are smoothed by the sample and hold circuit 50. The VSHP and VSHN signals are the differential output signals of the sample and hold circuit 50. The line driver 60 is utilized to improve the current driving ability of the output signal VLPFP, and is combined with a 2nd-order Rauch lowpass filter function to attenuate any out-of-band signals, which are typically above 500 KHz.

Figure 2:
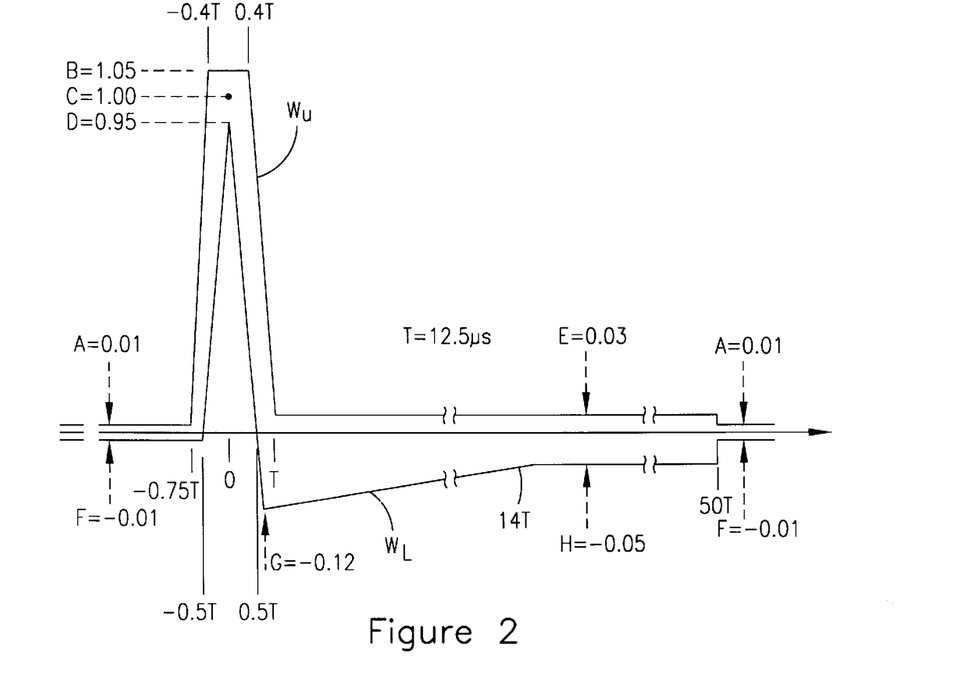
FIG. 2 illustrates a time-domain standard single pulse output waveform in accordance with the specifications of ANSI T1 5.3.2.1 and 5.3.2.2 for U-interface, showing the upper and lower output limits for relative real voltage values shown in Table 1.0.

FIG. 2 shows the upper and lower bound time-domain standard single pulse output wave-forms $W_U$, $W_L$ in accordance with the specification of ANSI T1 5.3.2.1 and 5.3.2.2 for U-interface. The time period T=12.5 μs, is calculated from the ISDN bandwidth frequency of 80 kHz $$\left(\frac{1}{1.25\,\mu s}\right).$$

The upper bound curve $W_u$ as shown in FIG. 2 is depicted by nodes A, B, E, and A and their relative times. The lower bound curve $W_L$ is depicted by nodes F, D, G, H, and F and their relative times. The upper and lower bound levels of nodes A, B, C, D, E, and F are all normalized values. Table 1 below shows the real output voltage of these normalized levels for different 2B1Q code input (+3, +1, −1, −3). The voltage level is measured on telephone line and accordingly, the single pulse output waveform on the telephone line must be within the region of upper bound and lower bound curves $W_u$ and $W_L$.

TABLE 1

| Normalized level: | Voltage level with respect to relative 2B1Q code | | | |
|---|---|---|---|---|
| | +3 | +1 | −1 | −3 |
| A | 0.01 | 0.025 | 0.00833 | −0.00833 | −0.025 |
| B | 1.05 | 2.625 | 0.87500 | −0.87500 | −2.625 |
| C | 1.00 | 2.500 | 5/6 | −5/6 | −2.500 |
| D | 0.95 | 2.375 | 0.79167 | −0.79167 | −2.375 |
| E | 0.03 | 0.075 | 0.02500 | −0.02500 | −0.075 |
| F | −0.01 | −0.025 | −0.00833 | 0.00833 | 0.025 |
| G | −0.12 | −0.300 | −0.10000 | 0.10000 | 0.300 |
| H | −0.05 | −0.125 | −0.04167 | 0.04167 | 0.125 |

Figure 3:
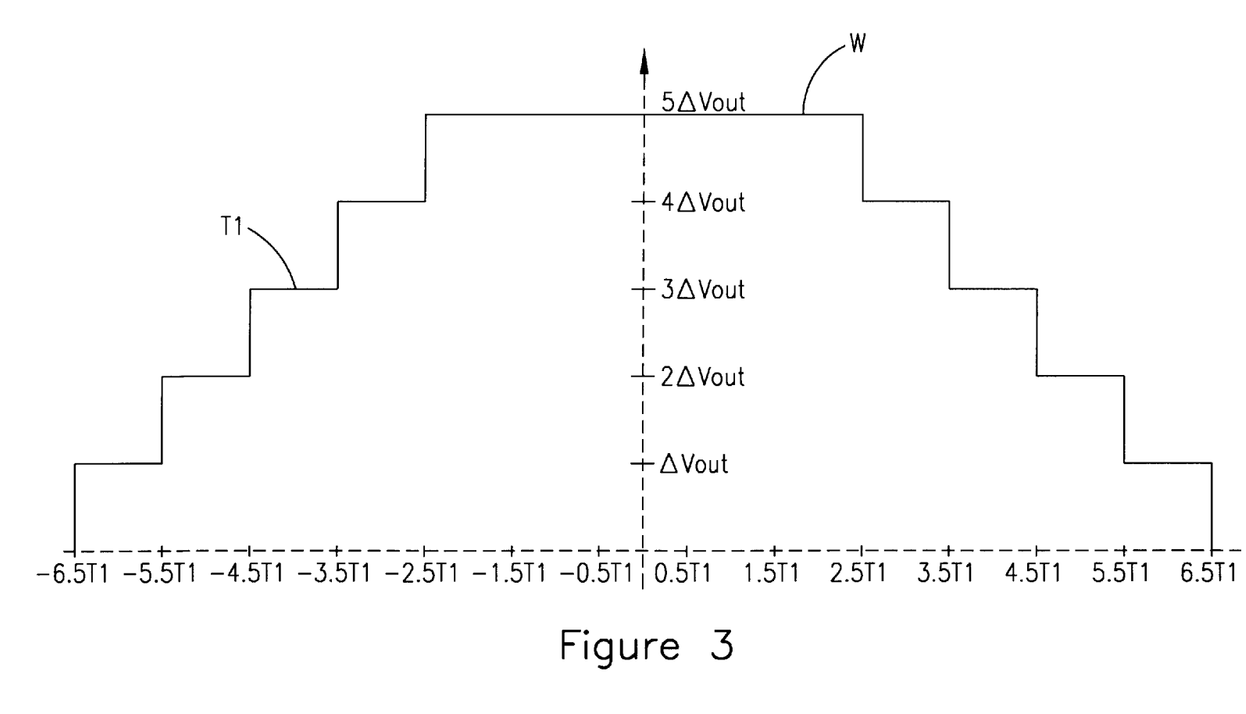
FIG. 3 is a shaped single pulse output waveform of the switched-capacitor integrator in accordance with the present invention.

FIG. 3 shows single pulse staircase-type output waveform W in the case of +1 2B1Q code input. The fully differential switched-capacitor integrator 40 and sample and hold circuit 50 as shown in FIG. 1 are designed to generate this waveform which conforms with the specification requirements of the upper and lower bound levels shown in FIG. 2. The time period T1, defined as $$\left(T1 = \frac{T}{12} = \frac{12.5\,\mu s}{12} = \frac{1}{960\text{ kHz}}\right),$$

is the sample rate of the sample and hold circuit 50, and is also the time period of each step in the staircase. The value $\Delta V_{out}$ is the output difference of the fully differential switched-capacitor integrator 40 in successive time periods T1 when input 2B1Q code is +1.

Figure 4A:
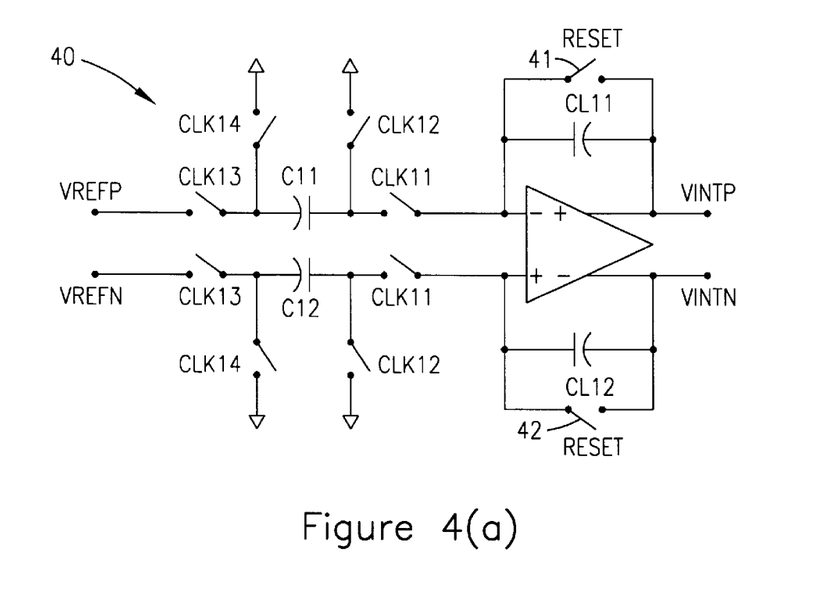
Figure 4B:
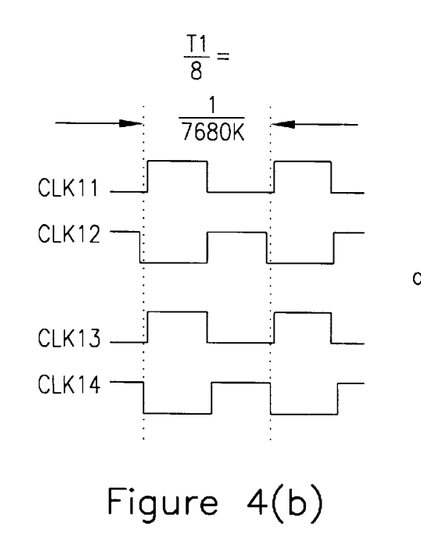

FIG. 4(a) shows the schematic diagram of the fully differential switched-capacitor integrator 40. VREFP and VREFN are positive and negative reference voltages for circuit 40. Clocks CLK11, CLK12, CLK13, and CLK14 are variable time period control clocks of circuit 40. As shown in FIG. 4(b) every CLK11 high-low period is $$\left(\frac{T1}{8} = \frac{1}{7680\text{ kHz}}\right).$$

Figure 4C:
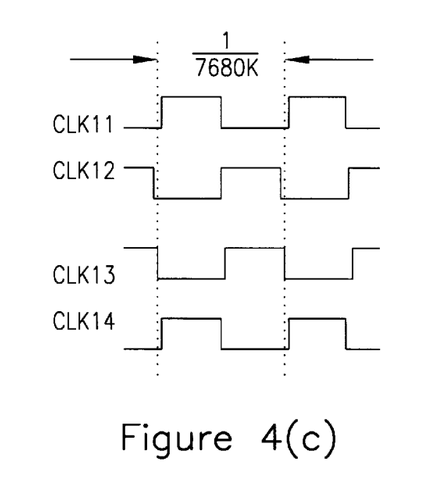

CLK12 is the inverse phase non-overlap clock of CLK11 and CLK14 is the inverse phase of non-overlap clock of CLK13. The clock phase, of CLK13 has a little delay with respect to CLK11 or CLK12. CLK13, which is in phase with CLK11, as shown in FIG. 4(b), or in phase with CLK12, as shown in FIG. 4(c), mainly determines the output waveform of the fully differential switched-capacitor integrator 40 in leading or trailing slopes. The capacitors C11 and C12, shown in FIG. 4(a), are input capacitors, and capacitors CL11 and CL12 are integration capacitors. The input capacitors C11 and C12 are utilized to charge from VREFP and VREFN, respectively, every time CLK13 is on. The integration capacitors CL11 and CL12 are utilized to accumulate or decrease charge every time CLK11 is on. The RESET switches 41, 42, also shown in FIG. 4(a), are controlled by a reset signal S shown in FIG. 1 to reset the outputs VINTP and VINTN. The output VINTP increases or decreases $\Delta V_{out}$ when CLK11 is high-low in every time period $$\left(\frac{T1}{8}\right).$$

Figure 5A:
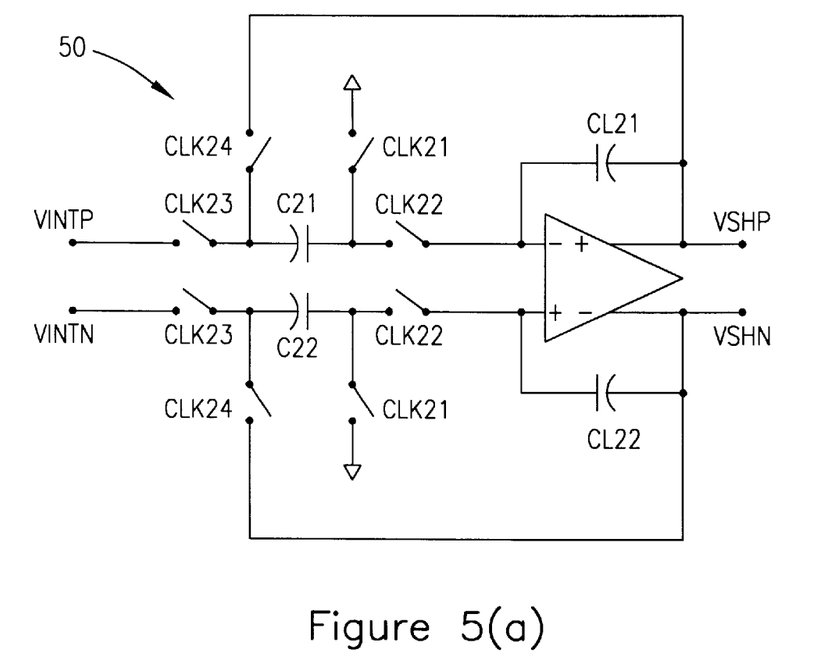
Figure 5B:
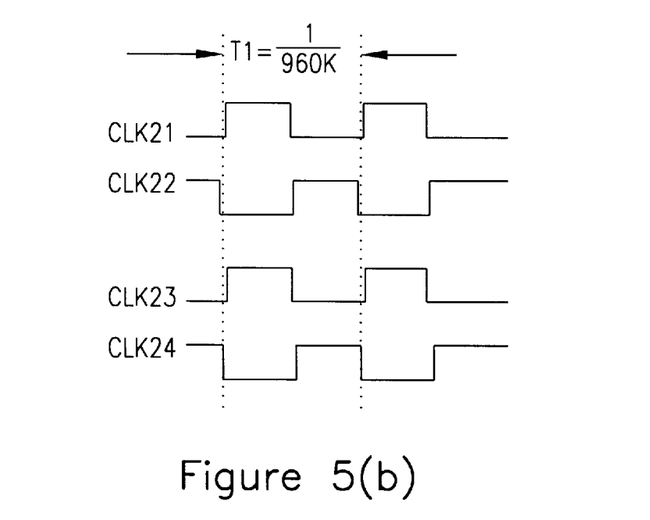

FIG. 5(a) shows the schematic diagram of the sample and hold circuit 50. The input signals VINTP and VINTN, which are the outputs of the fully differential switched-capacitor integrator 40, are the fully differential inputs for the sample and hold circuit 50. CLK21, CLK22, CLK23, and CLK24 are constant time period control clocks of this circuit. As shown in FIG. 5(b), these control clocks work at a time period $$T1 = \left(\frac{1}{960\text{ kHz}}\right).$$

CLK22 is the inverse phase of non-overlap clock of CLK21 and CLK24 is the inverse phase non-overlap clock of CLK23. TFhe clock phase of CLK23 has a little delay with respect to CLK21. The capacitors C21 and C22 shown in FIG. 5(a) are input capacitors that facilitate a hold function, while capacitors CL21 and CL22 are integration capacitors. The outputs VSHP and VSHN are the fully differential output of the sample and hold circuit 50. The sample and hold circuit 50 is utilized to smooth by filtering the unwanted spike signal which is generated by the fully differential switched-capacitor integrator 40. Another function of the sample and hold circuit 50 is to reduce the staircase step number count, by example, by reducing three staircase steps to one step staircase in time period T1, as shown in FIG. 6(*b*) when the 2B1Q input code is ±3. This staircase number reduction greatly increases the output signal linearity. The staircase step number reduction phenomenon will be described in the successive sections.

Figure 6A:
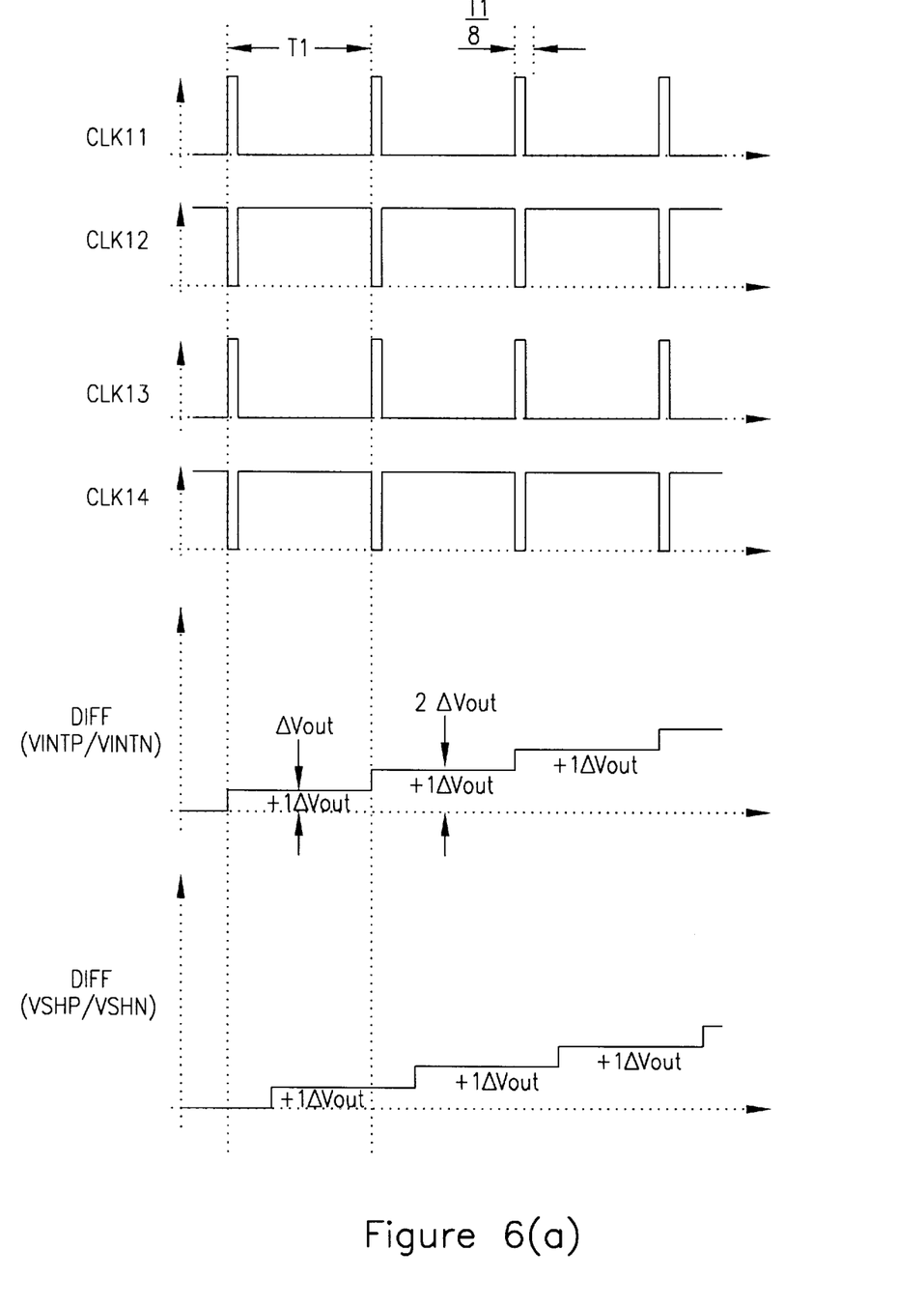
Figure 6B:
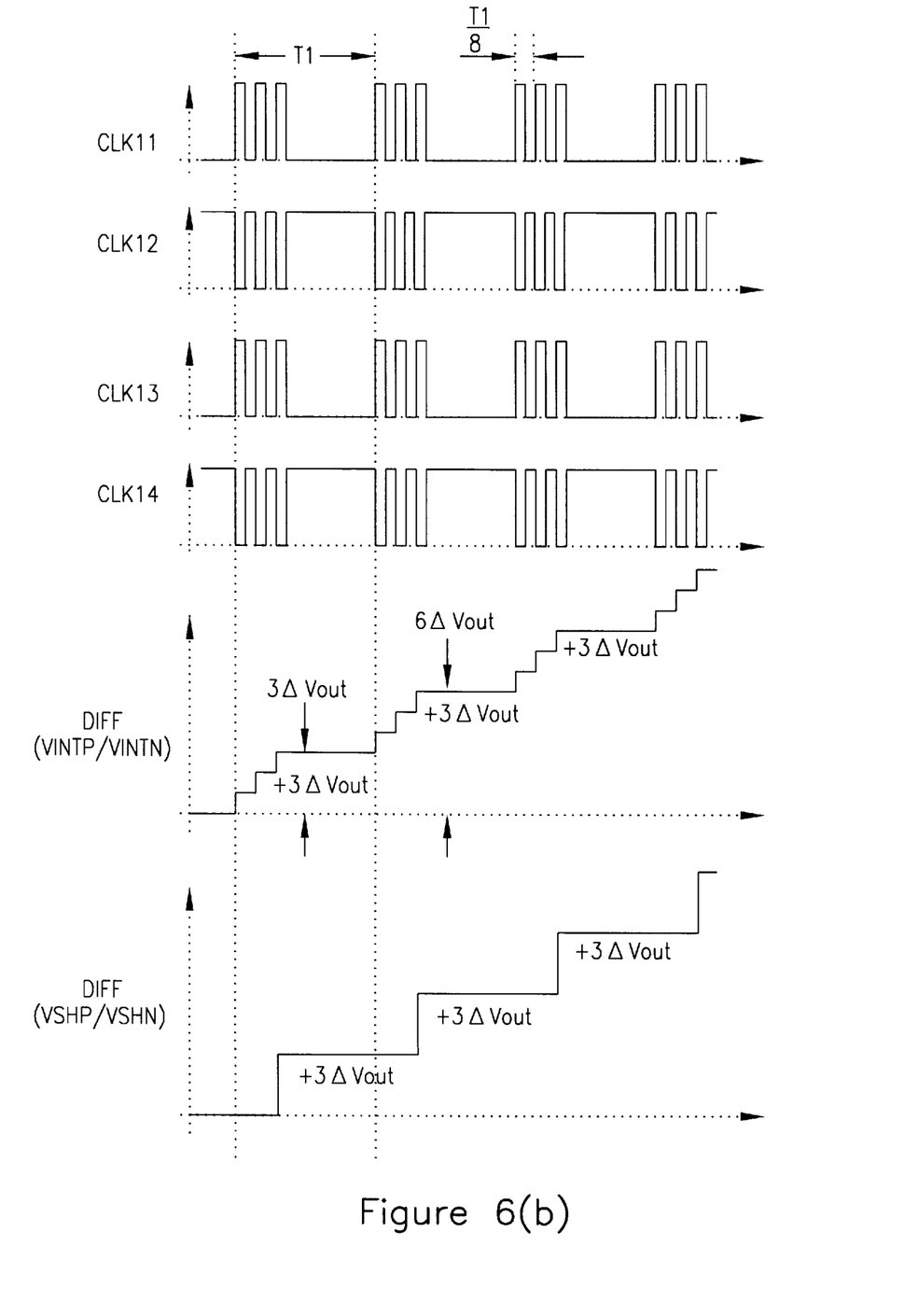

FIGS. 6(*a*) and 6(*b*) show the leading edge output waveforms DIFF(VINTP/VINTN), DIFF(VSHP/VSHN) of fully differential switched-capacitor integrator 40 and sample and hold circuit 50 and their main relative control clock signals CLK11, CLK12, CLK13, and CLK14. FIG. 6(*a*) depicts the control clock signals and the leading edge output waveforms DIFF(VINTP/VINTN) and DIFF(VSHP/VSHN) when input 2B1Q signal is +1 or −1. FIG. 6(*b*) depicts the control clock signals and leading edge output waveforms when input 2B1Q signal is +3 or −3. The CLK11 and CLK13 signals are in the same clock phase, similarly, CLK12 and CLK14 signals are in the same clock phase when shaping the leading edge of the waveform. Hereafter, this relationship of clocks CLK11, CLK12, CLK13, and CLK14 is referred to as leading edge mode clocks. The term $\Delta V_{out}$ is the output voltage difference during one CLK11 pulse period $$\left(\frac{T1}{8}\right),$$

where $$\Delta V_{out} = \left(\frac{C11}{CL11}\right)$$

VREFP. Accordingly, when shaping the leading edge response to a ±1 2B1Q code input, the one pulse clock during one time period T1, allows the integrator output to increase $\Delta V_{out}$. Similarly, when shaping the leading edge response of a ±3 code input, the three pulse clocks during one time period T1 allow the integrator output to increase $3\Delta V_{out}$. The output waveform of DIFF(VSHP/VSHN) has some time delay with respect to DIFF(VINTP/VINTN). This small delay is due to the grouped delay of the sample and hold circuit 50. As shown in FIG. 6(*b*), DIFF(VINTP/VINTN) possesses three incremental steps in every time period T1. As described earlier, and also as shown in FIG. 6(*b*), the sample and hold circuit 50 filters the three steps to generate a single step as shown in the DIFF(VSHP/VSHN) waveform.

Figure 7A:
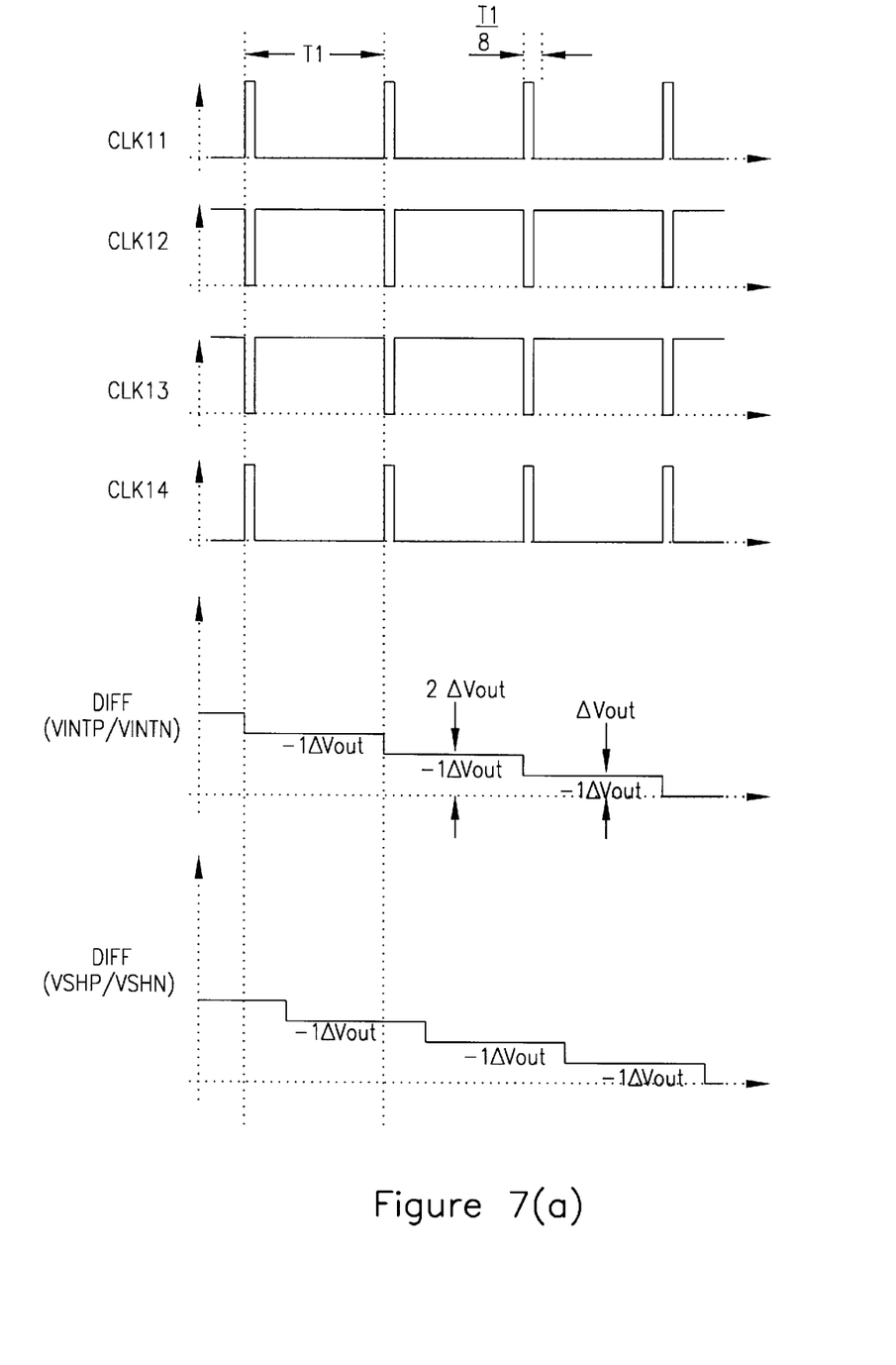
Figure 7B:
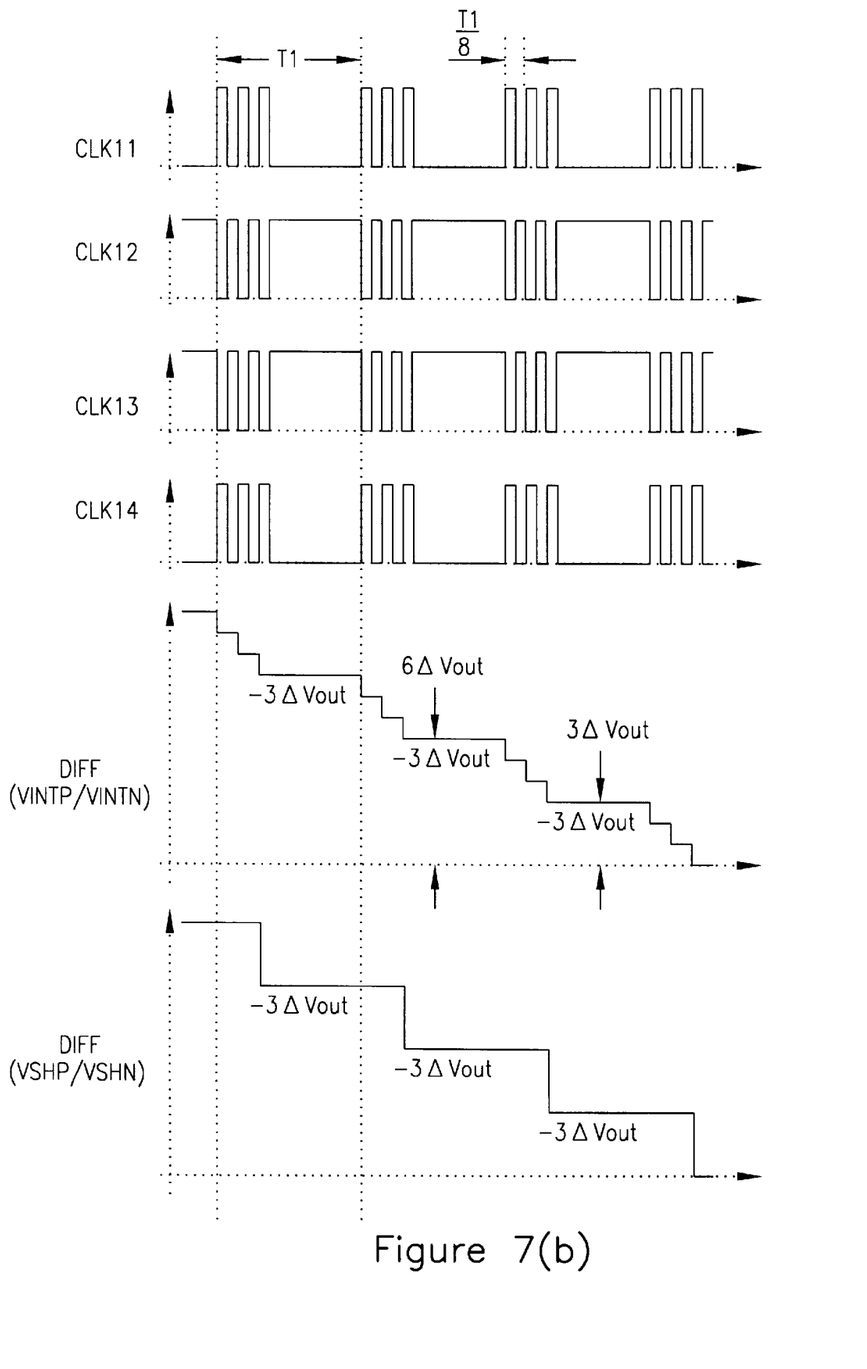

FIGS. 7(*a*) and 7(*b*) show the trailing edge output waveforms of fully differential switched-capacitor integrator 40 and sample and hold circuit 50 and their main relative control clock signals CLK11, CLK12, CLK13, and CLK14. FIG. 7(*a*) depicts the control clock signals and the trailing edge output waveforms DIFF(VINTP/VINTN), DIFF (VSHP/VSHN) when input 2B1Q signal is +1 or −1. FIG. 7(*b*) depicts the control clock signals and the trailing edge output waveforms DIFF(VINTP/VINTN), DIFF(VSHP/VSHN) when input 2B1Q signal is +3 or −3. The CLK11 and CLK14 signals are in the same clock phase when in trailing edge. Hereafter, this relationship of clocks CLK11, CLK12, CLK13, and CLK14 is referred to as the trailing edge mode clocks. When shaping the trailing edge response to a ±1 2B1Q code input, the one pulse clocks (during one T1 period) allow the integrator output to decrease $\Delta V_{out}$. Similarly, when in trailing edge of ±3 code input, the three pulse clocks (during one T1 period) allow the integrator output to decrease $3\Delta V_{out}$.

Figure 8A:
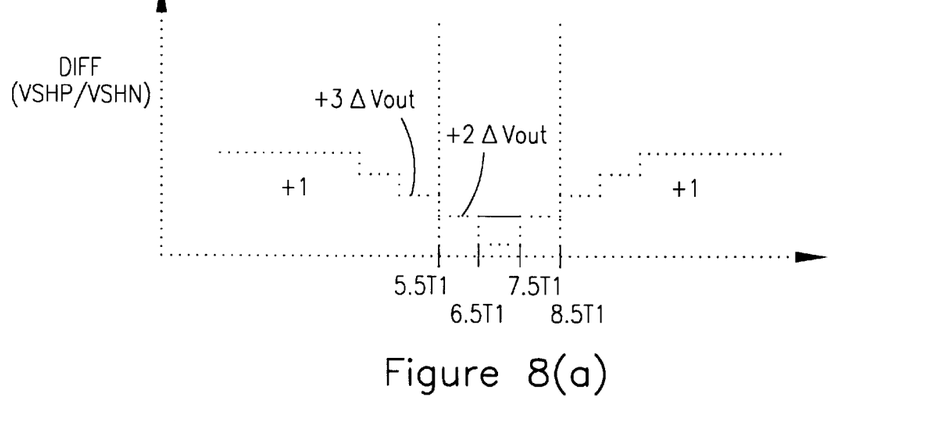

Because the time period $$T1 = \frac{T}{12}$$

and 13 T1 periods were utilized to shape a single pulse signal, as shown in FIG. 3, there must be one T1 period overlap between successive pulse signals, for example, an overlap during period 6.5T1 to 7.5T1, as shown in FIGS. 8(*a*), 9(*a*), and 10(*a*). Accordingly, in the present invention, the output waveform of the fully differential integrator 40 superimposes two overlap values between every overlap period, for example at period 6.5T1–7.5T1.

Figure 8B:
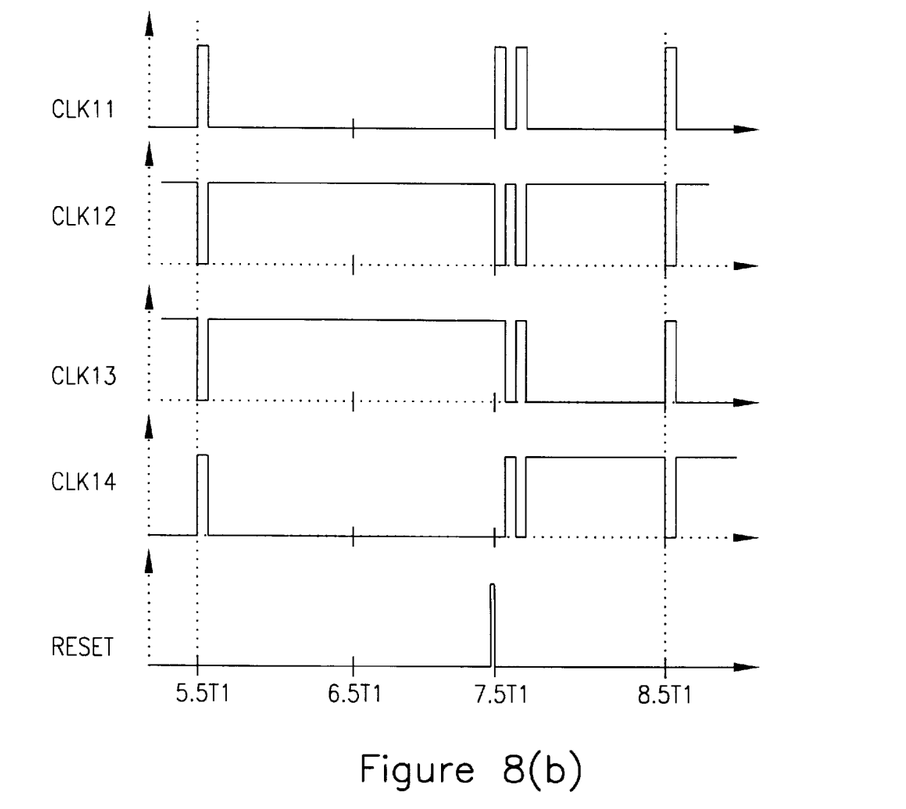

FIG. 8(*a*) shows the signal change response of sample and hold circuit 50 as the signal input changes from +1 to +1 in time periods 5.5T1 to 8.5T1. Also shown in FIG. 8(*b*) are the main relative control clock signals CLK11, CLK12, CLK13, CLK14, and RESET, which generate the waveform shown in FIG. 8(*a*). The control clock signals need special control logic to perform the specific output waveform change around these overlap periods. As shown in FIG. 8(*a*), after the instance of 5.5T1, the output voltage changes from $+3\Delta V_{out}$ to $+2\Delta V_{out}$, so a one pulse trailing edge mode clock is required at 5.5T1, as shown in FIG. 8(*b*). During the period from 5.5T1 to 6.5T1, the output voltage is $+2\Delta V_{out}$. In accordance with the superposition requirement discussed above, after the instance of 6.5T1, the overlap output voltage is also $+2\Delta V_{out}$ ($\Delta V_{out}+\Delta V_{out}$), due to 2B1Q code changing from +1 to +1 as shown in FIG. 8(*a*). To facilitate the overlap superposition, the control clock signals CLK11, CLK12, CLK13, CLK14 are not changed during the period 6.5T1 to 7.5T1, as shown in FIG. 8(*b*). To facilitate the 2B1Q signal change from +1 to +1, a RESET signal operation is performed before 7.5T1 to reset the output signal of the integrator 40 to zero, see also FIG. 8(*b*). After the instance of 7.5T1, the integrator 40 restarts to integrate the output voltage to $+2\Delta V_{out}$. In order to effect the $+2\Delta V_{out}$ output voltage, a series of two pulse leading edge mode clocks are needed in this instance, as shown in FIG. 8(*b*).

Figure 9A:
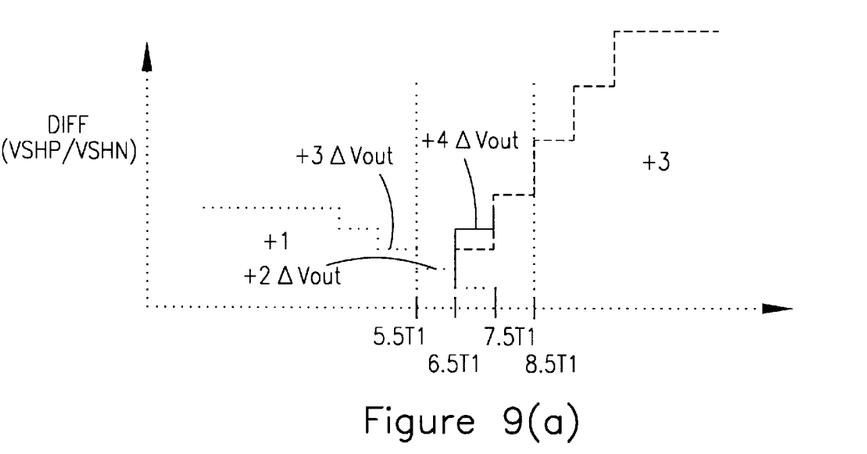
Figure 9B:
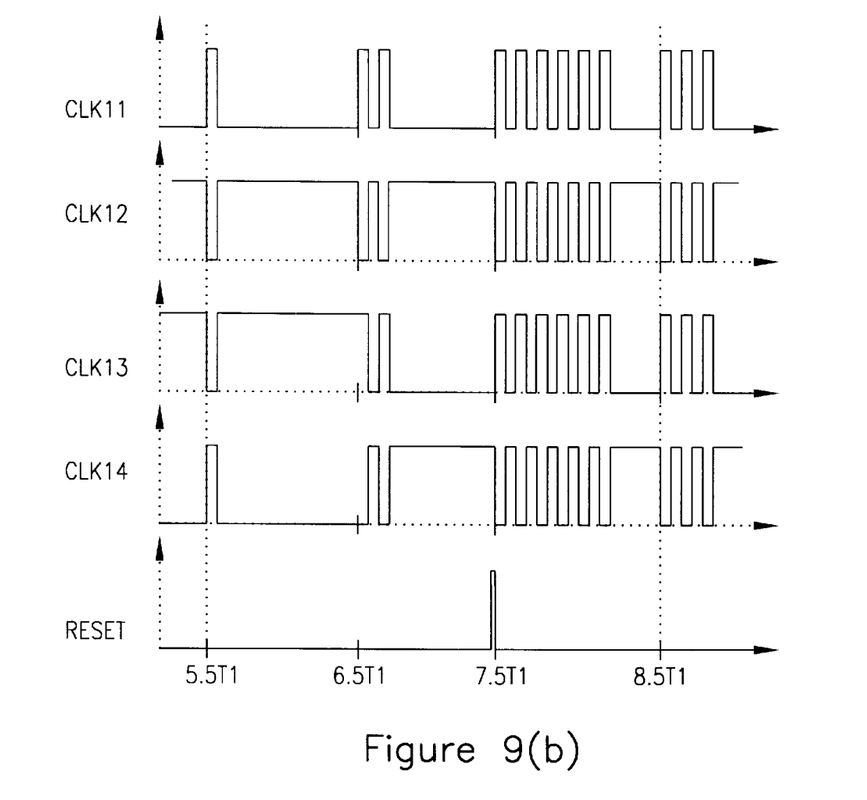

FIG. 9(*a*) shows the signal change response of sample and hold circuit 50 as the signal input changes from +1 to +3 in time periods from 5.5T1 to 8.5T1. Also shown in FIG. 9(*b*) are the main relative control clock signals CLK11, CLK12, CLK13, CLK14, and RESET, which generate the waveform shown in FIG. 9(*a*). As shown in FIG. 9(*a*), after the instance of 5.5T1, the output voltage changes from $+3\Delta V_{out}$ to $+2\Delta V_{out}$, so a one pulse trailing edge mode clocks is required at 5.5T1, as shown in FIG. 9(*b*). During the period from 5.5T1 to 6.5T1, the output voltage is $+2\Delta V_{out}$. In accordance with the superposition requirement discussed above, after the instance of 6.5T1, the overlap output voltage is $+4\Delta V_{out}$ ($1\Delta V_{out}+3\Delta V_{out}$), due to 2B1Q code changing from +1 to +3 as shown in FIG. 9(*a*). To facilitate the overlap superposition, the control clock signals CLK11, CLK12, CLK13, CLK14 are changed from one pulse trailing edge mode clocks to two pulse leading edge mode clocks during 6.5T1 to 7.5T1, as shown in FIG. 9(*b*). To facilitate the 2B1Q signal changing from +1 to +3, a RESET signal operation is performed before 7.5T1 to reset the output signal of the integrator 40 to zero, see also FIG. 9(*b*). After the instance of 7.5T1, the integrator 40 restarts to integrate the output voltage to $+6\Delta V_{out}$. In order to effect the $+6\Delta V_{out}$ output voltage, a series of six pulse leading edge mode clocks are needed in this instance, as shown in FIG. 9(*b*).

Figure 10A:
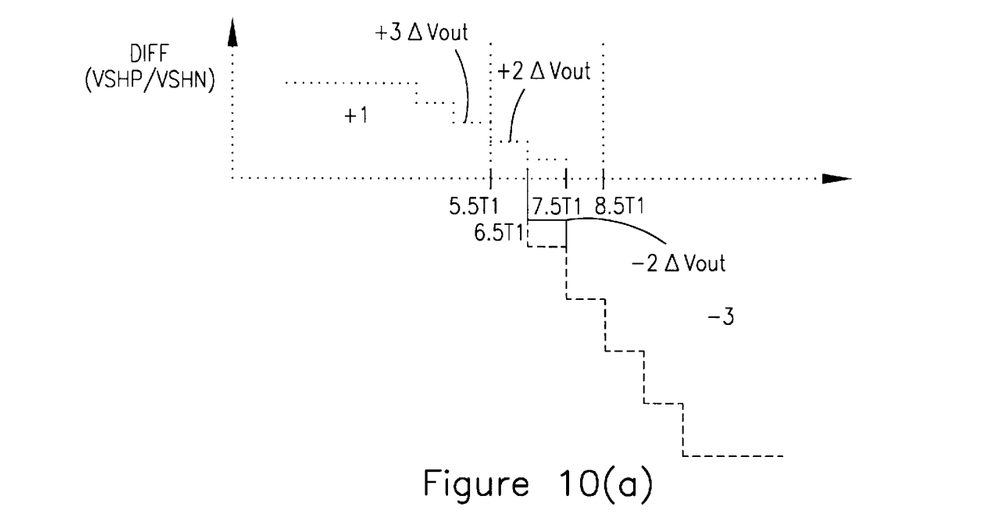
Figure 10B:
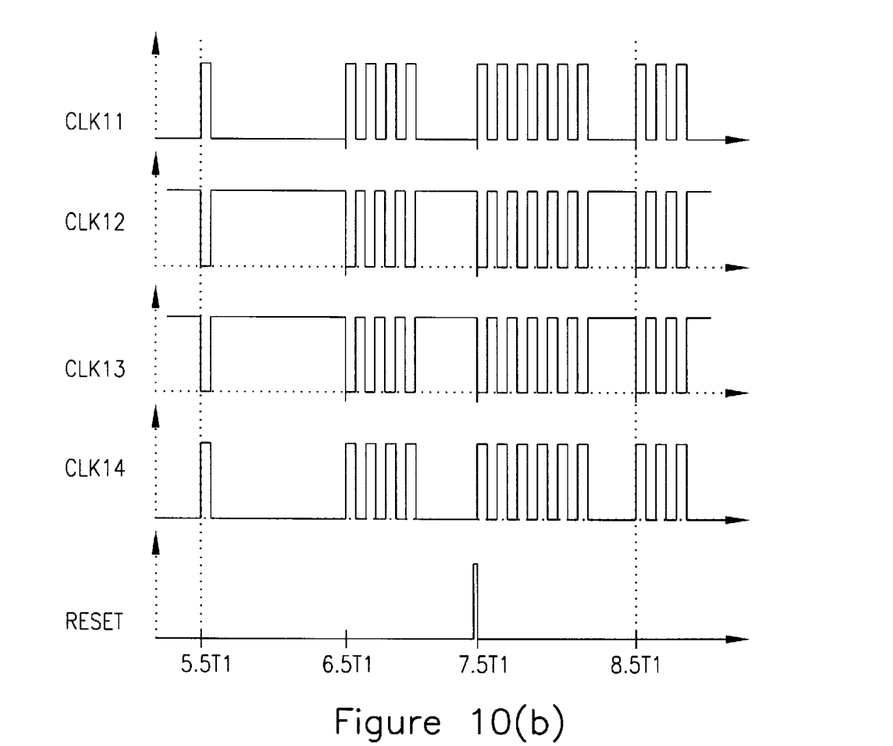

FIG. 10(a) shows the signal change response of sample and hold circuit 50 as the signal input changes from +1 to −3 in time periods from 5.5T1 to 8.5T1. Also shown in FIG. 10(a) are the main relative control clock signals CLK11, CLK12, CLK13, CLK14, and RESET, which generate the waveform shown in FIG. 10(a). As shown in FIG. 10(a), after the instance of 5.5T1, the output voltage changes from +3$\Delta V_{out}$ to +2$\Delta V_{out}$. Accordingly, a one pulse trailing edge mode clocks is required at 5.5T1, as shown in FIG. 10(b). During the period from 5.5T1 to 6.5T1, the output voltage is +2$\Delta V_{out}$. In accordance with the superposition requirements discussed above, after the instance of 6.5T1, the overlap output voltage is −2$\Delta V_{out}$ (1$\Delta V_{out}$−3$\Delta V_{out}$), due to 2B1Q code changing from +1 to −3, as shown in FIG. 10(b). To facilitate the overlap superposition, the control clock signals CLK11, CLK12, CLK13, CLK14 are changed from one pulse to four pulse trailing edge mode clocks during 6.5T1 to 7.5T1, as shown in FIG. 10a). To facilitate the 2B1Q signal changing from +1 to −3, a RESET signal operation is performed before 7.5T1 to reset the output signal of the integrator 40 to zero, see also FIG. 10(b). After the instance of 7.5T1, the integrator 40 restarts to integrate the output voltage to −6$\Delta V_{out}$. In order to effect the −6$\Delta V_{out}$ output voltage, a series of six pulse trailing edge mode clocks are needed in this instance, as shown in FIG. 10(b).

Figure 11:
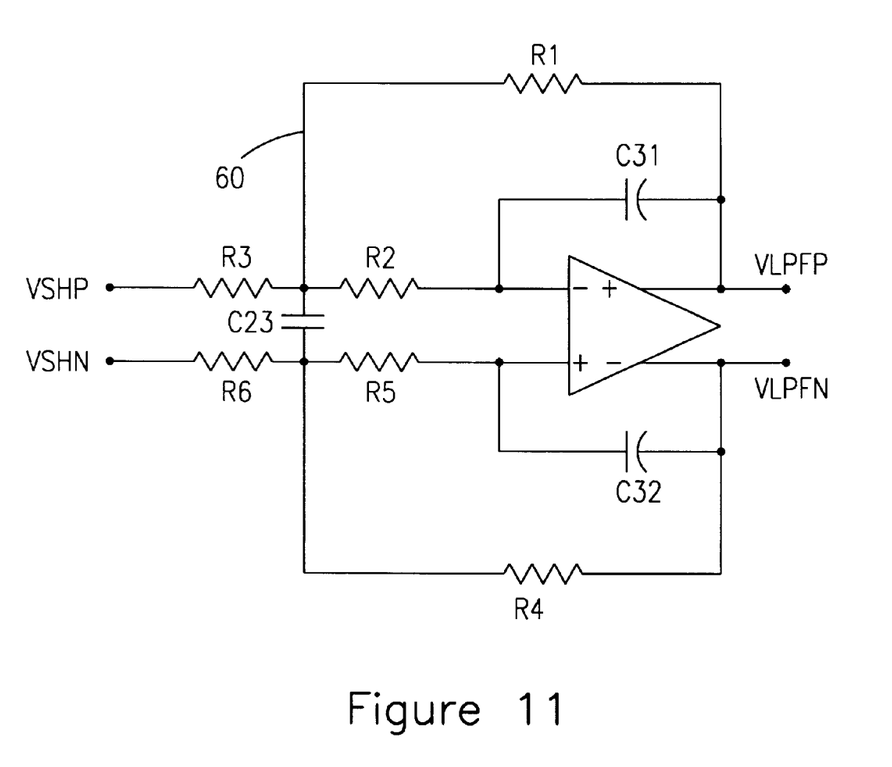
FIG. 11 illustrates a schematic diagram of the Rauch lowpass filter in accordance with the present invention.

FIG. 11 shows the schematic diagram for line driver/Rauch lowpass filter 60. The input signals, VSHP and VSHN, are the differential output signals of sample and hold circuit 50. The output signals of filter 60 are fully differential output signals VLPFP and VLPFN. Lowpass filter 60 is also a line driver which is utilized not only to smooth the shaped output signal to fit the spectrum standard of ANSI T1 5.3.2.1 and 5.3.2.2, but also to increase the current drive ability to drive the telephone line.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. The invention disclosed herein may be practiced without any element which is not specifically disclosed herein.

What is claimed is:

1. A pulse shaping circuit apparatus for reshaping digital input signals for use in an ISDN U-interface, said circuit apparatus comprising:

(a) at least two control clock signal generators responsive to control logic circuitry;

(b) a switched-capacitor integrator circuit, said integrator circuit being electrically coupled to and being controlled by a first control clock signal generator member of said at least two control clock signal generators, said integrator circuit having integrator circuit element means for generating a first staircase-shaped waveform in response to a first set of non-overlap, variable period clock pulse signals and a reset signal generated by said first control clock signal generator member;

(c) a sample and hold circuit, said sample and hold circuit being electrically coupled to and being controlled by a second control clock signal generator member of said at least two control clock signal generators and also being electrically coupled to said integrator circuit and having sample and hold circuit elements for generating a second staircase-shaped waveform in response to both a first set of non-overlap, constant period clock pulse signals from said second control clock signal generator member and to an analog voltage input from said integrator circuit, said analog voltage input comprising said first staircase-shaped waveform, said second staircase-shaped waveform comprising a reshaped signal; and (d) a low-pass filter and line driver circuit combination for outputting a filtered reshaped signal.

2. A pulse shaping circuit apparatus as described in claim 1, wherein:

said digital input signals comprise 2B1Q input code signals;

said first control clock signal generator member comprises a set of four non-overlap, variable period clocks and a reset control signal generator; and said second control clock signal generator member comprise a set of four non-overlap, constant period clocks, said set of four non-overlap, variable period clocks generating high-low pulse time periods which are a fraction of a time period associated with a high-low pulse time period generated by said set of four non-overlap, constant period clocks.

3. A pulse shaping circuit apparatus as described in claim 1, wherein:

said digital input signals comprise 2B1Q input code signals; and said integrator circuit element means comprises four clock-controlled switches, one input capacitor, one integration capacitor, one operational amplifier and one reset switch, said integrator circuit element means being configured in a non-differential structure and being coupled to said first control clock signal generator member.

4. A pulse shaping circuit apparatus as described in claim 1, wherein:

said digital input signals comprise 2B1Q input code signals; and said integrator circuit element means comprises eight clock-controlled switches, two input capacitor, two integration capacitor, one operational amplifier and two reset switches, said integrator circuit element means being configured in a differential structure and being coupled to said first control clock signal generator member.

5. A pulse shaping circuit apparatus as described in claim 1, wherein:

said digital input signals comprise 2B1Q input code signals; and said first staircase-shaped waveform comprising a plurality of steps associated with a +1 2B1Q digital input signal, said first staircase-shaped waveform being void of transitional and incremental steps.

6. A pulse shaping circuit apparatus as described in claim 1, wherein:

said digital input signals comprise 2B1Q digital input code signals;

said first staircase-shaped waveform comprising a plurality of steps associated with a +3 2B1Q digital input signal, said first staircase-shaped waveform having three transitional and incremental steps formed during an interval immeditaly following commencement of formation of each of said plurality of steps, said three transitional and incremental steps being due to said integrator circuit performing integration of said +3 2B1Q digital input signal; and said sample and hold circuit generating said second staircase-shaped waveform conforming in shape with said first staircase-shaped waveform except being characterized in that second staircase-shaped waveform comprises a plurality of steps without said three transitional and incremental steps, said second staircase-shaped waveform further being characterized by having an increased waveform linearity compared to a waveform linearity of said first staircase-shaped waveform.

7. A pulse shaping circuit apparatus as described in claim 1, wherein:
said low-pass filter and line driver circuit combination comprises a Rauch lowpass filter, and said line driver enhancing current drive capability for transmitting said reshaped signal via a telephone line.

8. A pulse shaping circuit apparatus for reshaping signals for use in an ISDN U-interface, said circuit apparatus comprising:
(a) at least two control clock signal generators responsive to control logic circuitry, wherein:
a first control clock signal generator member of said at least two control clock signal generators being electrically coupled to a source of digital input signals, said first control clock signal generator generating a first set of non-overlap, variable period clocks and a reset signal, said first set of non-overlap, variable period clocks being representative of said digital input signals, said digital input signals comprising multilevel digital signals, and said first set of non-overlap, variable period clocks comprising discrete clock pulses having a time domain duration related to a bandwidth frequncy requirement of said ISDN U-interface, and
a second clock signal generator member of said at least two control clock signal generators generating a first set of non-overlap, constant period clocks;
(b) a switched-capacitor integrator circuit, said integrator circuit being electrically coupled to and being controlled by said first clock signal generator member, said integrator circuit having integrator circuit element means for generating a first staircase-shaped waveform in response to said first set of non-overlap, variable period clocks and said reset signal,
said first staircase-shaped waveform comprising a plurality of steps which include a discernable number of transitional and incremental steps corresponding to integrator circuit switching action associated with a particular level of said digital input signals and which are also associated with a particular number of discrete clock pulses generated by said set of non-overlap, variable period clocks received from said first clock signal generator member during a time period associated with a single step of said first staircase-shaped waveform;
(c) a sample and hold circuit, said sample and hold circuit being electrically coupled to and being controlled by said second clock signal generator and also being electrically coupled to said integrator circuit and having sample and hold circuit elements for generating a second staircase-shaped waveform in response to an analog voltage input from said integrator circuit, said analog voltage input comprising said first staircase-shaped waveform,
said second staircase-shaped waveform conforming in shape with said first staircase-shaped waveform and being characterized in that said second staircase-shaped waveform comprises steps without said transitional and incremental steps and having increased waveform linearity compared to a waveform linearity of said first staircase-shaped waveform; and
(d) a low-pass filter and line driver circuit combination, said low-pass filter and line driver circuit combination being electrically coupled to said sample and hold circuit for receiving, and filtering said second staircase-shaped waveform, and for transmitting a reshaped signal, said reshaped signal being filtered of unwanted high frequency signals contained in said second staircase-shaped waveform which exceed specifications of said said ISDN U-interface.

9. A pulse shaping circuit apparatus as described in claim 8, wherein:
said digital input signals comprise 2B1Q input code signals;
said first clock signal generator member comprises a set of four non-overlap, variable period clocks and a reset control signal generator; and
said second clock signal generator member comprises a set of four non-overlap, constant period clocks, said set of four non-overlap, variable period clocks comprising high-low pulse time periods which are a fraction of a time period associated with a high-low pulse time period generated by said set of four non-overlap, constant period clocks.

10. A pulse shaping circuit apparatus as described in claim 8, wherein:
said digital input signals comprise 2B1Q input code signals; and
said integrator circuit element means comprises four clock-controlled switches, one input capacitor, one integration capacitor, one operational amplifier and one reset switch, said integrator circuit element means being configured in a non-differential structure and being coupled to said first control clock signal generator member.

11. A pulse shaping circuit apparatus as described in claim 8, wherein:
said digital input signals comprise 2B1Q input code signals;
said integrator circuit element means comprises eight clock-controlled switches, two input capacitor, two integration capacitor, one operational amplifier and two reset switches, said integrator circuit element means being configured in a differential structure and being coupled to said first control clock signal generator member.

12. A pulse shaping circuit apparatus as described in claim 8, wherein:
said digital input signals comprise 2B1Q input code signals; and
said first staircase-shaped waveform comprising a plurality of steps associated with a +1 2B1Q digital input signal, said first staircase-shaped waveform being void of transitional and incremental steps.

13. A pulse shaping circuit apparatus as described in claim 8, wherein:
said digital input signals comprise 2B1Q digital input code signals;
said first staircase-shaped waveform comprising a plurality of steps associated with a +3 2B1Q digital input signal, said first staircase-shaped waveform having three transitional and incremental steps formed during an interval immediately following commencement of formation of each of said plurality of steps, said three transitional and incremental steps being due to said integrator circuit performing integration of said +3 2B1Q digital input signal; and said sample and hold circuit generating said second staircase-shaped waveform conforming in shape with said first staircase-shaped waveform except being characterized in that second staircase-shaped waveform comprises a plurality of steps without said three transitional and incremental steps, said second staircase-shaped waveform further being characterized by having an increased waveform linearity compared to a waveform linearity of said first staircase-shaped waveform.

14. A pulse shaping circuit apparatus as described in claim 8, wherein:

said low-pass filter and line driver circuit combination comprises a Rauch lowpass filter, and said line driver enhancing current drive capability for transmitting said reshaped signal via a telephone line.

15. A method for generating a reshaped digital signal for use in an ISDN U-interface, said method comprising the steps of:

(a) providing a pulse shaping circuit apparatus, said circuit apparatus comprising:
   (i) at least two control clock signal generators responsive to control logic circuitry;
   (ii) a switched-capacitor integrator circuit, said integrator circuit being electrically coupled to and being controlled by a first control clock signal generator member of said at least two control clock signal generators, said integrator circuit having integrator circuit element means for generating a first staircase-shaped waveform in response to a first set of non-overlap, variable period clock pulse signals and a reset signal generated by said first control clock signal generator member;
   (iii) a sample and hold circuit, said sample and hold circuit being electrically coupled to and being controlled by a second control clock signal generator member of said at least two control clock signal generators and also being electrically coupled to said integrator circuit and having sample and hold circuit elements for generating a second staircase-shaped waveform in response to both a first set of non-overlap, constant period clock pulse signals from said second control clock signal generator member and to an analog voltage input from said integrator circuit, said analog voltage input comprising said first staircase-shaped waveform; and
   (iv) a low-pass filter and line driver circuit combination for outputting a reshaped signal;

(b) providing a digital input signal to said at least two control clock signal generators;

(c) generating a first set of non-overlap, variable period clock pulse signals from said at least two control clock signal generators and inputting to said integrator circuit;

(d) responding to said first set of non-overlap, variable period clock pulse signals by generating a first staircase-shaped waveform;

(e) inputting an analog signal from said integrator circuit, comprising said first staircase-shaped waveform, to said sample and hold circuit;

(e) generating a second set of non-overlap, constant period clock pulse signals from said at least two control clock signal generators and inputting to said sample and hold circuit; and (f) generating a reshaped signal from said sample and hold circuit.

16. A method for generating a reshaped digital signal as described in claim 15, said method further comprising a step of:

(g) filtering said reshaped signal to attenuate out-of-band signal power to meet ANSI specifications.

17. A method for generating a reshaped digital signal as described in claim 15, wherein:

said provided digital input signal comprises four-level digital 2B1Q coded signals.

18. A method for generating a reshaped digital signal as described in claim 15, wherein:

said step (f) comprises generating a reshaped signal waveform having reduced staircase steps compared to said first staircase-shaped waveform in step (d).

19. A pulse shaping circuit apparatus for reshaping digital input signals for use in an ISDN U-interface, said circuit apparatus comprising:

(a) at least two control clock signal generators responsive to control logic circuitry;

(b) a switched-capacitor integrator circuit, said integrator circuit being electrically coupled to and being controlled by a first control clock signal generator member of said at least two control clock signal generators, said integrator circuit having integrator circuit element means for generating a first staircase-shaped waveform in response to a first set of non-overlap, variable period clock pulse signals and a reset signal generated by said first control clock signal generator member; and (c) a sample and hold circuit, said sample and hold circuit being electrically coupled to and being controlled by a second control clock signal generator member of said at least two control clock signal generators and also being electrically coupled to said integrator circuit and having sample and hold circuit elements for generating a second staircase-shaped waveform in response to both a first set of non-overlap, constant period clock pulse signals from said second control clock signal generator member and to an analog voltage input from said integrator circuit, said analog voltage input comprising said first staircase-shaped waveform, said second staircase-shaped waveform comprising a reshaped signal.

20. A pulse shaping circuit apparatus as described in claim 19, said apparatus comprising:

a low-pass filter and line driver circuit combination for outputting a filtered reshaped signal.

* * * * *

UNITED STATES PATENT AND TRADEMARK OFFICE
CERTIFICATE OF CORRECTION

PATENT NO.   : 6,181,748 B1                                         Page 1 of 1
DATED        : January 30, 2001
INVENTOR(S)  : Hsan-Fong Lin, Wen-Fu Yang, Jhy-Rong Cheng It is certified that error appears in the above-identified patent and that said Letters Patent is hereby corrected as shown below:

Column 4,
Line 14, after the words "code is", please delete [+1] and replace with -- ±1 --.
Line 63, after "CLK23.", please delete [TFhe] and replace with -- The --.

Column 8,
Line 49, after the words "with a", please delete [+1] and replace with -- ±1 --.
Line 57, after the word "a", please delete [+3] and replace with -- ±3 --.
Line 63, after the word "said", please delete [+3] and replace with -- ±3 --

Column 10,
Line 53, after the word "a", please delete [+1] and replace with -- ±1 --.
Line 61, after the word "a", please delete [+3] and replace with -- ±3 --

Column 11,
Line 2, after the word "said", please delete [+3] and replace with -- ±3 --.

Signed and Sealed this

Seventh Day of August, 2001

*Attest:*

*Attesting Officer*

NICHOLAS P. GODICI
*Acting Director of the United States Patent and Trademark Office*